US010123475B2

United States Patent
Posselius et al.

(10) Patent No.: US 10,123,475 B2
(45) Date of Patent: Nov. 13, 2018

(54) SYSTEM AND METHOD FOR AUTOMATICALLY MONITORING SOIL SURFACE ROUGHNESS

(71) Applicants: CNH Industrial America, LLC, New Holland, PA (US); Autonomous Solutions, Inc., Mendon, UT (US)

(72) Inventors: John H. Posselius, Ephrata, PA (US); Luca Ferrari, Modena (IT); Taylor C. Bybee, Mendon, UT (US); Bret T. Turpin, Wellsville, UT (US)

(73) Assignees: CNH Industrial America LLC, New Holland, PA (US); Autonomous Solutions, Inc., Mendon, UT (US)

( * ) Notice: Subject to any disclaimer, the term of this patent is extended or adjusted under 35 U.S.C. 154(b) by 0 days.

(21) Appl. No.: 15/423,811

(22) Filed: Feb. 3, 2017

(65) Prior Publication Data
US 2018/0220577 A1 Aug. 9, 2018

(51) Int. Cl.
*A01B 79/00* (2006.01)
*A01B 63/14* (2006.01)

(52) U.S. Cl.
CPC .......... *A01B 79/005* (2013.01); *A01B 63/14* (2013.01); *B60W 2300/152* (2013.01); *B60W 2420/403* (2013.01); *B60W 2420/52* (2013.01); *B60W 2420/54* (2013.01); *B60W 2422/95* (2013.01)

(58) Field of Classification Search
CPC ................................................ A01B 79/005
See application file for complete search history.

(56) References Cited

U.S. PATENT DOCUMENTS

| 4,935,700 A | 6/1990 | Garbini et al. |
| 5,044,756 A | 9/1991 | Gaultney et al. |
| 5,278,423 A | 1/1994 | Wangler et al. |

(Continued)

FOREIGN PATENT DOCUMENTS

| CN | 1447116 | 10/2003 |
| EP | 2668469 A1 | 12/2013 |

(Continued)

OTHER PUBLICATIONS

Ted M. Zobeck "Soil Surface Roughness Measurement" USDA, Agricultural Research Service, Lubbock, TX. Published 1990. (3 pages).

(Continued)

*Primary Examiner* — Basil T. Jos
(74) *Attorney, Agent, or Firm* — Rebecca L. Henkel; Rickard K. DeMille

(57) ABSTRACT

A method for automatically monitoring soil surface roughness as a ground-engaging operation is being performed within a field may include receiving pre-operation surface roughness data associated with a given portion of the field and receiving post-operation surface roughness data associated with the given portion of the field. In addition, the method may include analyzing the pre-operation and post-operation surface roughness data to determine a surface roughness differential associated with the performance of the ground-engaging operation and actively adjusting the operation of at least one of an associated work vehicle and/or implement when the surface roughness differential differs from a target set for the surface roughness differential.

20 Claims, 7 Drawing Sheets

(56) References Cited

U.S. PATENT DOCUMENTS

| | | | |
|---|---|---|---|
| 5,809,440 | A | 9/1998 | Beck et al. |
| 6,222,628 | B1 | 4/2001 | Corallo et al. |
| 6,608,672 | B1 | 8/2003 | Shibusawa et al. |
| 6,853,937 | B2* | 2/2005 | Shibusawa ........... A01B 79/005 250/253 |
| 6,919,959 | B2 | 7/2005 | Masten |
| 7,092,106 | B2 | 8/2006 | Cox et al. |
| 7,748,264 | B2 | 7/2010 | Prem |
| 8,065,054 | B2 | 11/2011 | Tarasinski et al. |
| 8,451,449 | B2 | 5/2013 | Holland |
| 8,755,049 | B2 | 6/2014 | Holland |
| 8,862,339 | B2 | 10/2014 | Henry et al. |
| 9,026,321 | B2 | 5/2015 | Henry et al. |
| 9,050,725 | B2 | 6/2015 | Shull |
| 9,148,995 | B2 | 10/2015 | Hrnicek et al. |
| 9,226,490 | B2 | 1/2016 | Keye |
| 9,282,688 | B2 | 3/2016 | Casper et al. |
| 9,428,885 | B2 | 8/2016 | Nau |
| 2007/0039745 | A1 | 2/2007 | Anderson et al. |
| 2014/0347448 | A1 | 11/2014 | Hegemann et al. |
| 2015/0268218 | A1 | 9/2015 | Troxler |
| 2015/0305226 | A1 | 10/2015 | Zemenchik |
| 2015/0305228 | A1 | 10/2015 | Zemenchik |
| 2015/0354943 | A1 | 12/2015 | Posselius et al. |
| 2016/0029547 | A1 | 2/2016 | Casper et al. |
| 2016/0057920 | A1 | 3/2016 | Spiller et al. |
| 2016/0134844 | A1 | 5/2016 | Casper et al. |
| 2017/0112043 | A1 | 4/2017 | Nair et al. |

FOREIGN PATENT DOCUMENTS

| | | |
|---|---|---|
| WO | WO 2009/153304 | 12/2009 |
| WO | WO 2012/029026 | 3/2012 |
| WO | WO 2016/110832 | 7/2016 |
| WO | WO 2017/049186 | 3/2017 |

OTHER PUBLICATIONS

Thuy Le Toan, F. Mattia, G. Satalino, T. Manninen and M. Borgeaud "On the Characterization of Agricultural Soil Roughness for Radar Remote Sensing Studies" Browaw Journals & Magazines Published Aug. 6, 2002. (3 pages).

W. Skierucha, A.M. Wilczek and R.T. Walczak "Application of Smart Sensors in the Measurement of Soil Physical Parameters" Institute of Agrophysics, Polish Academy of Sciences, Lublin, Poland Published 2004. (6 pages).

M.M Rahman, M.S. Moran, D.P. Thoma, R. Bryant, C.D. Holifield Collins, T. Jackson, B.J. Orr and M. Tischler "Mapping Surface Roughness and Soil Moisture Using Multi-Angle Radar Imagery Without Ancillary Data" Science Direct / Remote Sensing of Environment Published 2008. (12 pages).

L.M. Thomsen, J.E.M. Baartman, R.J. Barneveld, T. Starkloff and J. Stolte "Soil Surface Roughness: Comparing Old and New Measuring Methods and Application in a Soil Erosion Model" Land Management Group, Wageningen University, Wageningen, The Netherlands and Norwegian Institute of Agriculture and Environmental Research, Bioforsk, as Norway Published Apr. 24, 2015 (12 pages).

European Search Report for European Application No. 18154773.8, dated Jul. 2, 2018 (6 pages).

\* cited by examiner

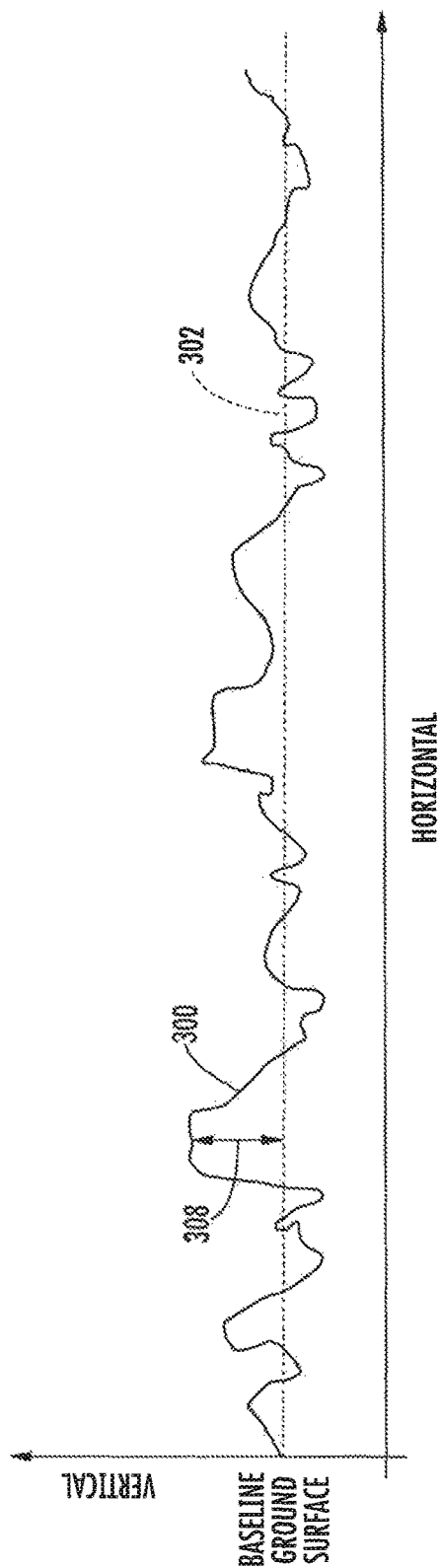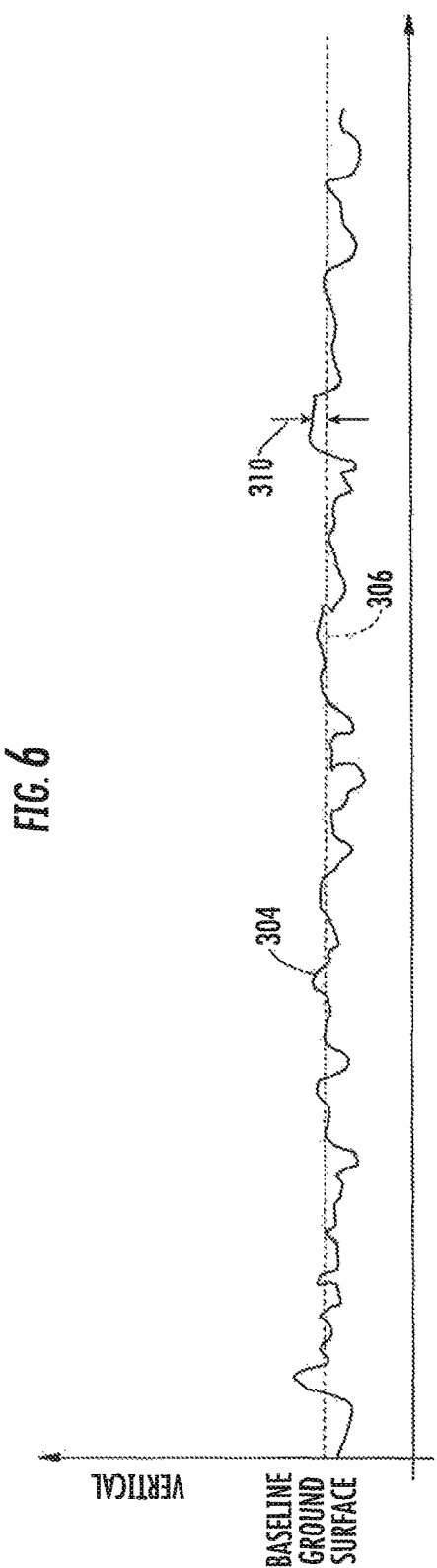

SYSTEM AND METHOD FOR AUTOMATICALLY MONITORING SOIL SURFACE ROUGHNESS

FIELD OF THE INVENTION

The present subject matter relates generally to performing ground-engaging operations using work vehicles and/or associated implements and, more particularly, to a system and method for automatically monitoring the soil surface roughness of a field during the performance of a ground-engaging operation.

BACKGROUND OF THE INVENTION

Soil surface roughness generally relates to the planarity or smoothness of the soil within a field and is typically impacted by uneven soil profiles, soil clumps, crop residue, and foreign objects within the field (e.g., rocks). For various reasons, soil surface roughness is an important field characteristic to consider when performing a ground-engaging operation, such as a tillage operation, a planting operation, a fertilizing operation, and/or the like. For example, the soil surface roughness can impact the environmental quality of the soil, including erosion resistance and moisture content. In addition, the soil surface roughness can affect the seedbed quality. As such, the ability to monitor and/or adjust the soil surface roughness within a field can be very important to maintaining a healthy, productive field, particularly when it comes to performing various ground-engaging operations.

While various systems and methods have been developed to allow the soil surface roughness within a field to be estimated, such systems and methods have various drawbacks or disadvantages. For example, most conventional surface roughness estimation techniques require manual measurements that can be very time consuming and labor-intensive. To address the issues associated with manual techniques, efforts have been made to develop systems that can automatically measure soil surface roughness. However, to date, such systems have failed to provide a system configuration that allows the change in soil surface roughness occurring as a result of the performance of a ground-engaging operation to be reliably and efficiently monitored.

Accordingly, an improved system and method for automatically monitoring the soil surface roughness of a field during the performance of a ground-engaging operation that overcomes one or more of the issues in the prior art would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for automatically monitoring soil surface roughness as a ground-engaging operation is being performed within a field using a work vehicle towing an implement. The method may include receiving, with one or more computing devices, pre-operation surface roughness data associated with a given portion of the field, wherein the pre-operation surface roughness data corresponds to surface roughness data for the given portion of the field captured prior to the ground-engaging operation being performed thereon. The method may also include receiving, with the one or more computing devices, post-operation surface roughness data associated with the given portion of the field, wherein the post-operation surface roughness data corresponds to surface roughness data for the given portion of the field captured after the ground-engaging operation has been performed thereon. Additionally, the method may include analyzing, with the one or more computing devices, the pre-operation and post-operation surface roughness data to determine a surface roughness differential associated with the performance of the ground-engaging operation and actively adjusting, with the one or more computing devices, the operation of at least one of the work vehicle or the implement when the surface roughness differential differs from a target set for the surface roughness differential.

In another aspect, the present subject matter is directed to a system for automatically monitoring soil surface roughness as a ground-engaging operation is being performed within a field using a work vehicle towing an implement. The system may include at least one non-contact soil roughness sensor configured to capture data associated with a soil roughness of the field as the ground-engaging operation is being performed. The system may also include a controller commutatively coupled to the non-contact soil roughness sensor(s). The controller may include a processor and associated memory. The memory may store instructions that, when implemented by the processor, configure the controller to receive, from the non-contact soil roughness sensor(s), pre-operation surface roughness data associated with a given portion of the field, wherein the pre-operation surface roughness data corresponds to surface roughness data for the given portion of the field capture prior to the ground-engaging operation being performed thereon. The controller may also be configured to receive, from the non-contact soil roughness sensor(s), post-operation surface roughness data associated with the given portion of the field, wherein the post-operation surface roughness data corresponds to surface roughness data for the given portion of the field captured after the ground-engaging operation has been performed thereon. In addition, the controller may be configured to analyze the pre-operation and post-operation surface roughness data to determine a surface roughness differential associated with the performance of the ground-engaging operation and actively adjust the operation of at least one of the work vehicle or the implement when the surface roughness differential differs from a target set for the surface roughness differential.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 6 illustrates an example data plot of soil surface roughness data for a field having a relatively rough soil profile;

FIG. 7 illustrates an example data plot of soil surface roughness data for a field having a relatively smooth soil profile.

DETAILED DESCRIPTION OF THE INVENTION

Figure 1:
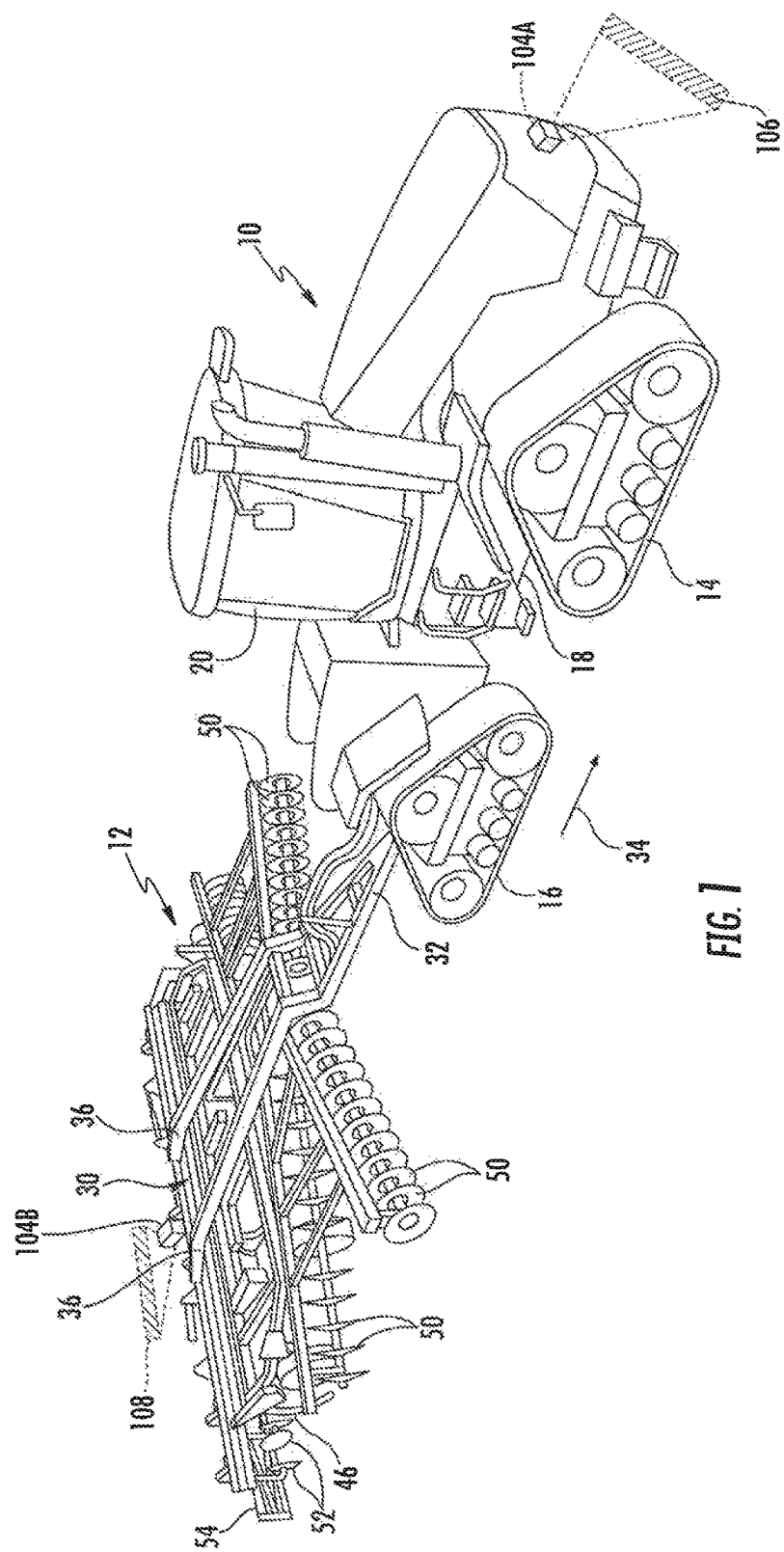
FIG. 1 illustrates a perspective view of one embodiment of a work vehicle towing an implement in accordance with aspects of the present subject matter, particularly illustrating non-contact soil roughness sensors provided in operative association with the work vehicle and the implement.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for automatically monitoring the soil surface roughness of a field during the performance of a ground-engaging operation. Specifically, in several embodiments, one or more non-contact soil roughness sensors (e.g., a LIDAR scanner, a stereo camera, an ultrasound device, a radar device and/or the like) may be provided in operative association with the work vehicle and/or the implement to capture surface roughness data of the field as the ground-engaging operation is being performed. As will be described below, in one embodiment, the soil roughness sensor(s) may be utilized to capture surface roughness data for various portions of the field both before and after the ground-engaging operation has been performed on such portions of the field. The pre-operation and post-operation surface roughness data may then be automatically analyzed via an associated controller to estimate or calculate the change in the surface roughness occurring as a result of the ground-engaging operation (also referred to herein as the surface roughness differential), which may provide an indication of the effectiveness of the implement in manipulating or otherwise adjusting the soil roughness as the operation is being performed. Thereafter, if it is determined that the effectiveness of the implement is deficient (e.g., due to surface roughness differential differing from a given target value or falling outside a given target range), the controller may be configured to automatically adjust the operation of the work vehicle and/or the implement in a manner designed to modify the effectiveness of the implement in decreasing or increasing the surface roughness of the soil, as desired. For example, the controller may be configured to automatically adjust the ground speed of the implement and/or adjust a ground-engaging parameter(s) associated with one or more ground-engaging tools of the implement (e.g., a penetration depth and/or a down pressure for one or more of the ground-engaging tools).

In addition to providing an indication of the current operating effectiveness of the implement, the surface roughness differential associated with the change in the surface roughness occurring as a result of the ground-engaging operation may also provide an indication of one or more roughness-related parameters associated with the field. For instance, if the soil surface differential is less than expected based on the current operating settings for the implement, the reduced differential may provide an indication that there is a large concentration of rocks or other foreign objects within the field. Similarly, a larger or smaller surface roughness differential than expected may also provide an indication that the texture of the soil too hard or too soft for the current operating settings of the implement.

Figure 2:
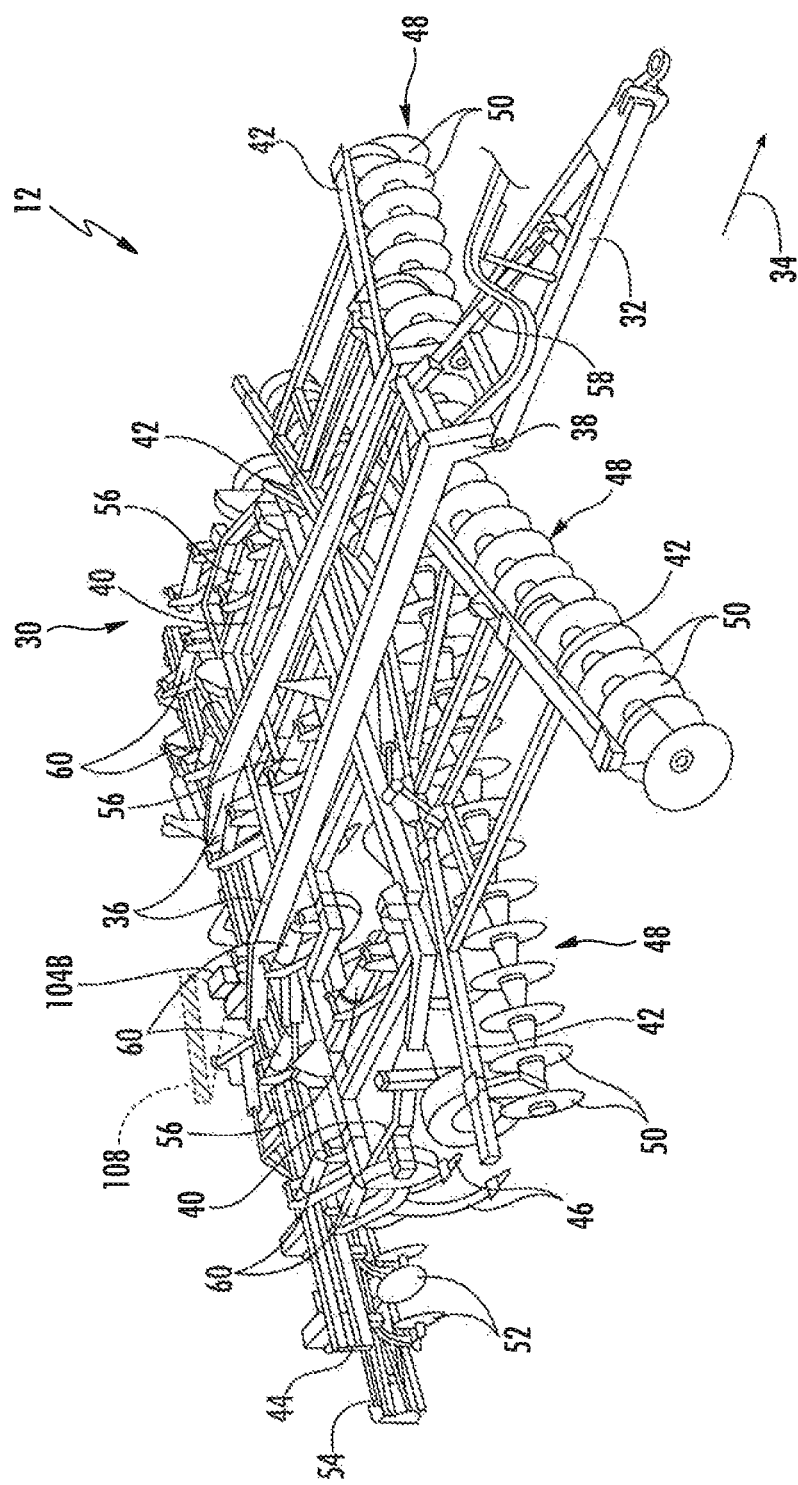
FIG. 2 illustrates a perspective view of the tillage implement shown in FIG. 1.

Referring now to drawings, FIGS. 1 and 2 illustrate perspective views of one embodiment of a work vehicle 10 and an associated implement 12 in accordance with aspects of the present subject matter. Specifically, FIG. 1 illustrates a perspective view of the work vehicle 10 towing the implement 12 (e.g., across a field). Additionally, FIG. 2 illustrates a perspective view of the implement 12 shown in FIG. 1. As shown in the illustrated embodiment, the work vehicle 10 is configured as an agricultural tractor and the implement 12 is configured as an associated tillage implement. However, in other embodiments, the work vehicle 10 may be configured as any other suitable agricultural vehicle and/or any other suitable type of work vehicle, such as a construction vehicle. Similarly, in other embodiments, the implement 12 may be configured as any other suitable agricultural implement and/or any other suitable type of implement configured to be towed by a work vehicle.

As particularly shown in FIG. 1, the work vehicle 10 includes a pair of front track assemblies 14, a pair or rear track assemblies 16 and a frame or chassis 18 coupled to and supported by the track assemblies 14, 16. An operator's cab 20 may be supported by a portion of the chassis 18 and may house various input devices for permitting an operator to control the operation of one or more components of the work vehicle 10 and/or one or more components of the implement 12. Additionally, as is generally understood, the work vehicle 10 may include an engine 22 (FIG. 4) and a transmission 24 (FIG. 4) mounted on the chassis 18. The transmission 24 may be operably coupled to the engine 22 and may provide variably adjusted gear ratios for transferring engine power to the track assemblies 14, 16 via a drive axle assembly (not shown) (or via axles if multiple drive axles are employed).

Additionally, as shown in FIGS. 1 and 2, the implement 12 may generally include a carriage frame assembly 30 configured to be towed by the work vehicle via a pull hitch or tow bar 32 in a travel direction of the vehicle (e.g., as indicated by arrow 34). As is generally understood, the carriage frame assembly 30 may be configured to support a plurality of ground-engaging tools, such as a plurality of shanks, disk blades, leveling blades, basket assemblies, tines, spikes, and/or the like. In several embodiments, the various ground-engaging tools may be configured to perform a tillage operation or any other suitable ground-engaging operation across the field along which the implement 12 is being towed. It should be understood that, in addition to being towed by the work vehicle 10, the implement 12 may also be a semi-mounted implement connected to the work vehicle 10 via a two point hitch (not shown) or the implement 12 may be a fully mounted implement (e.g., mounted the work vehicle's 10 three point hitch (not shown)).

As particularly shown in FIG. 2, the carriage frame assembly 30 may include aft extending carrier frame members 36 coupled to the tow bar 32. In addition, reinforcing gusset plates 38 may be used to strengthen the connection between the tow bar 32 and the carrier frame members 36. In several embodiments, the carriage frame assembly 30 may generally function to support a central frame 40, a forward frame 42 positioned forward of the central frame 40 in the direction of travel 34 of the work vehicle 10, and an aft frame 44 positioned aft of the central frame 40 in the direction of travel 34 of the work vehicle 10. As shown in FIG. 2, in one embodiment, the central frame 40 may correspond to a shank frame configured to support a plurality of ground-engaging shanks 46. In such an embodiment, the shanks 46 may be configured to till or otherwise engage the soil as the implement 12 is towed across the field. However, in other embodiments, the central frame 40 may be configured to support any other suitable ground-engaging tools.

Additionally, as shown in FIG. 2, in one embodiment, the forward frame 42 may correspond to a disk frame configured to support various gangs or sets 48 of disk blades 50. In such an embodiment, each disk blade 50 may, for example, include both a concave side (not shown) and a convex side (not shown). In addition, the various gangs 48 of disk blades 50 may be oriented at an angle relative to the travel direction 34 of the work vehicle 10 to promote more effective tilling of the soil. However, in other embodiments, the forward frame 42 may be configured to support any other suitable ground-engaging tools.

Moreover, similar to the central and forward frames 40, 42, the aft frame 44 may also be configured to support a plurality of ground-engaging tools. For instance, in the illustrated embodiment, the aft frame is configured to support a plurality of leveling blades 52 and rolling (or crumbler) basket assemblies 54. However, in other embodiments, any other suitable ground-engaging tools may be coupled to and supported by the aft frame 44, such as a plurality closing disks.

In addition, the implement 12 may also include any number of suitable actuators (e.g., hydraulic cylinders) for adjusting the relative positioning, penetration depth, and/or down force associated with the various ground-engaging tools 46, 50, 52, 54. For instance, the implement 12 may include one or more first actuators 56 coupled to the central frame 40 for raising or lowering the central frame 40 relative to the ground, thereby allowing the penetration depth and/or the down pressure of the shanks 46 to be adjusted. Similarly, the implement 12 may include one or more second actuators 58 coupled to the forward frame 42 to adjust the penetration depth and/or the down pressure of the disk blades 50. Moreover, the implement 12 may include one or more third actuators 60 coupled to the aft frame 44 to allow the aft frame 44 to be moved relative to the central frame 40, thereby allowing the relevant operating parameters of the ground-engaging tools 52, 54 supported by the aft frame 44 (e.g., the down pressure and/or the penetration depth) to be adjusted.

It should be appreciated that the configuration of the work vehicle 10 described above and shown in FIG. 1 is provided only to place the present subject matter in an exemplary field of use. Thus, it should be appreciated that the present subject matter may be readily adaptable to any manner of work vehicle configuration. For example, in an alternative embodiment, a separate frame or chassis may be provided to which the engine, transmission, and drive axle assembly are coupled, a configuration common in smaller tractors. Still other configurations may use an articulated chassis to steer the work vehicle 10, or rely on tires/wheels in lieu of the track assemblies 14, 16.

It should also be appreciated that the configuration of the implement 12 described above and shown in FIGS. 1 and 2 is only provided for exemplary purposes. Thus, it should be appreciated that the present subject matter may be readily adaptable to any manner of implement configuration. For example, as indicated above, each frame section of the implement 12 may be configured to support any suitable type of ground-engaging tools, such as by installing any combination of shanks, disk blades, leveling blades, basket assemblies, tines, spikes, and/or the like on or more sections of the frame assembly 30. Alternatively, as opposed to the illustrated tillage implement, the implement 12 may be configured as a planting implement, a fertilizing implement and/or any other suitable type of agricultural implement.

Additionally, in accordance with aspects of the present subject matter, the work vehicle 10 and/or the implement 12 may include one or more non-contact soil roughness sensors 104 coupled thereto and/or supported thereon for monitoring the surface roughness of the field as a ground-engaging operation (e.g., a tillage operation, a planting operation, fertilizing operation, and/or the like) is being performed thereon via the implement 12. Specifically, in several embodiments, the soil roughness sensor(s) 104 may be provided in operative association with the work vehicle 10 and/or the implement 12 such that the sensor(s) 104 has a field of view or sensor detection range directed towards a portion(s) of the field adjacent to the work vehicle 10 and/or the implement 12. As such, the soil roughness sensor(s) 104 may be used to detect the surface roughness of the adjacent portions of the field as the tractor 10 and/or implement 12 passes by such portions of the field during the performance of the ground-engaging operation.

In general, the non-contact soil roughness sensor(s) 104 may correspond to any suitable sensing device(s) configured to detect or capture data associated with the surface roughness of the soil. For instance, in several embodiments, the soil roughness sensor(s) 104 may correspond to a Light Detection and Ranging ("LIDAR") device(s), such as a LIDAR scanner(s). In such embodiments, the soil roughness sensor(s) 104 may be configured to output light pulses from a light source (e.g., a laser outputting a pulsed laser beam) and detect the reflection of each pulse off of the soil surface. Based on the time of flight of the light pulses, the specific location (e.g., 3-D coordinates) of the soil surface relative to the sensor(s) 104 may be calculated. By scanning the pulsed light over a given swath width, the surface roughness of the soil may be detected across a given section of the field. Thus, by continuously scanning the pulsed light along the soil surface as the work vehicle 10 and the implement 12 are moved across the field, a point cloud may be generated that includes surface roughness data for all or a portion of the field.

In another embodiment, the soil roughness sensor(s) 104 may correspond to a suitable camera(s) configured to capture three-dimensional images of the soil surface, thereby allowing the soil surface roughness to be calculated or estimated by analyzing the content of each image. For instance, in a particular embodiment, the soil roughness sensor(s) 104 may correspond to a stereographic camera(s) having two or more lenses with a separate image sensor for each lens to allow the camera(s) to capture stereographic or three-dimensional images. In a further embodiment, the soil roughness sensor(s) 104 may correspond to any other suitable sensing device(s) configured to detect or capture surface roughness data using a non-contact detection methodology, such as an acoustic sensor or an electromagnetic sensor. For instance, the soil roughness sensor(s) 104 may correspond to an ultrasound device configured to emit ultrasound waves and detect the reflection of such waves off of the soil surface to allow the surface roughness to be estimated. Alternatively, the soil roughness sensor(s) 104 may correspond to a radar device configured to emit radar waves and detect the reflection of such waves off of the soil surface to allow the surface roughness to be estimated.

In several embodiments, two or more soil roughness sensors 104 may be provided in operative association with the work vehicle 10 and/or the implement 12. For instance, as shown in FIGS. 1 and 2, in one embodiment, a first soil roughness sensor 104A may be provided at a forward end 70 (FIG. 3) of the work vehicle 10 to allow the sensor 104A to capture data associated with the soil roughness of an adjacent first section 106 of the field disposed in front of the work vehicle 10. For instance, for each detection event, the first soil roughness sensor 104A may be configured to capture soil roughness data along a plane or reference line that extends generally perpendicular to the travel direction 34 of the work vehicle 10 directly in front of the vehicle 10. Similarly, as shown in FIGS. 1 and 2, a second soil roughness sensor 104B may be provided at or adjacent to an aft end 76 (FIG. 3) of the implement 12 to allow the sensor 104B to capture data associated with the soil roughness of an adjacent second section 108 of the field disposed behind the implement 12. For instance, for each detection event, the second soil roughness sensor 104B may be configured to capture soil roughness data along a plane or reference line that extends generally perpendicular to the travel direction 34 of the work vehicle 10 at a location directly behind the implement 12.

By capturing soil surface roughness data at a location forward of the ground engaging tools 46, 50, 52, 54 of the implement 12 (e.g., at the location detected by the first soil roughness sensor 104A) and at a location aft of the ground engaging tools 46, 50, 52, 54 (e.g., at the location detected by the second soil roughness sensor 104B) as the work vehicle 10 tows the implement 12 to allow a ground-engaging operation to be performed along a given section of the field, the sensors 104A, 104B may be used to collect data both before and after the performance of the ground-engaging operation. As will be described below, by analyzing the pre-operation and post-operation roughness data captured by the soil roughness sensors 104A, 104B, an associated controller 102 (FIG. 4) may then be configured to calculate or estimate a surface roughness differential for the field that provides an indication of the current effectiveness of the implement 12 in adjusting the surface roughness of the soil. As indicated above, the surface roughness differential may also provide an indication of one or more roughness-related parameters of the soil, such as the concentration of rocks or foreign objects within the soil and/or the soil texture. Based on the estimated surface roughness differential, the controller 102 may, for example, control/adjust the operation of the work vehicle 10 and/or the implement 12, as necessary, to ensure that the surface roughness differential is maintained at a given target value and/or within a given target range (e.g., an operating range defined around a target roughness differential desired for the specific ground-engaging operation being performed within the field).

Figure 3:
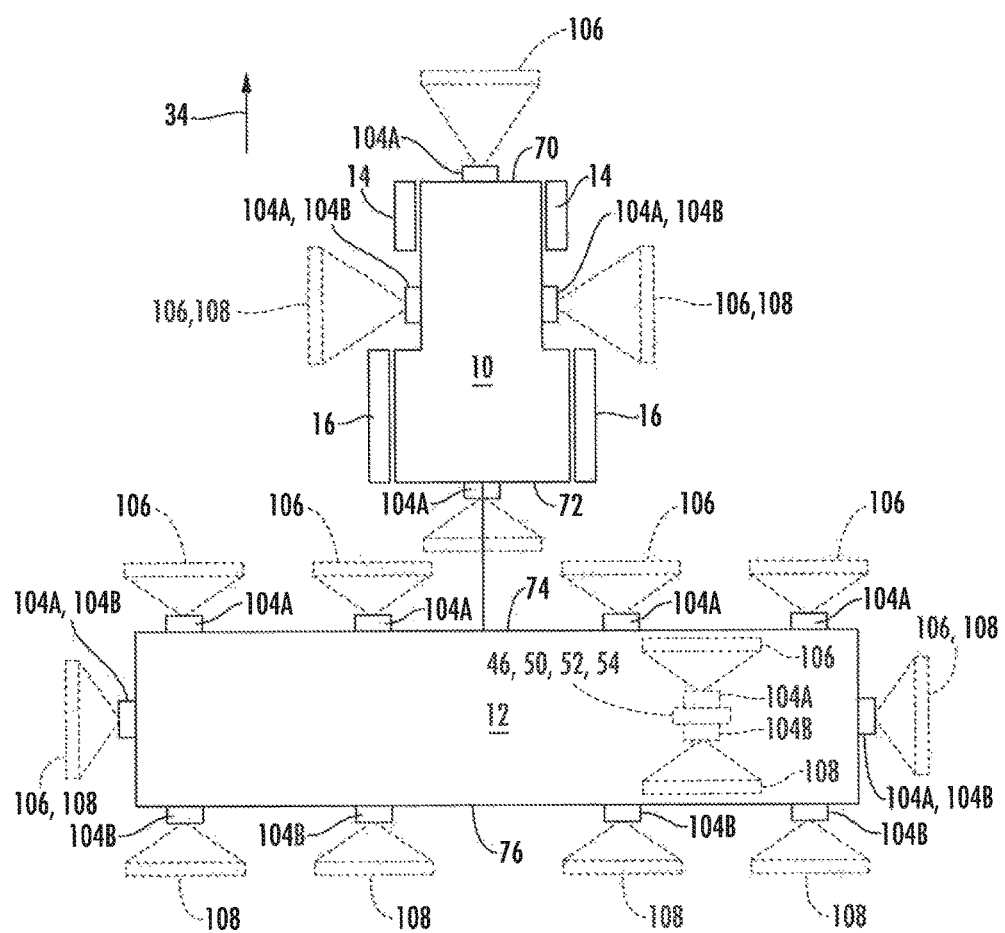
FIG. 3 illustrates a schematic, top down view of the work vehicle and the implement shown in FIGS. 1 and 2, particularly illustrating various examples of alternative locations for installing soil roughness sensors on the work vehicle and/or the implement.

It should be appreciated that, in alternative embodiments, the soil roughness sensor(s) 104A, 104B may be installed at any other suitable location(s) that allows the sensor(s) 104A, 104B to capture surface roughness data before and after the performance of the associated ground-engaging operation. For instance, FIG. 3 illustrates a schematic, top-down view of the work vehicle 10 and the implement 12 shown in FIGS. 1 and 2, particularly illustrating alternative sensor locations for the first and second soil roughness sensor(s) 104A, 104B. As shown, as alternative to positioning the first soil roughness sensor(s) 104A at the forward end 70 of the work vehicle 10, the first soil roughness sensor(s) 104A may be positioned at any other suitable location forward of one or more of the ground engaging tools 46, 50 52, 54 of the implement 10 in the travel direction 34 of the work vehicle 10, such as at or adjacent to an aft end 72 of the work vehicle 10, at or adjacent to a forward end 74 of the implement 12, at or adjacent to one of the sides of the work vehicle 10, and/or at or adjacent to one of the sides of the implement 12. Similarly, as an alternative to positioning the second soil roughness sensor(s) 104B at the aft end 76 of the implement 12, the second soil roughness sensor(s) 104B may be positioned at any other suitable location aft of one or more of the ground engaging tools 45, 50, 52, 54 of the implement 12 in the travel direction 34 of the work vehicle 10. For instance, as shown in FIG. 3, the second soil roughness sensor(s) 104B may be positioned at a location immediately behind a given ground-engaging tool 46, 50, 52, 54 of the implement 12. In such an embodiment, a first soil roughness sensor(s) 104A may, for example, be similarly positioned at a location immediately in front of the ground-engaging tool 46, 50, 52, 54 to allow data associated with the surface roughness of the soil to be captured immediately forward and aft of the ground-engaging tool 46, 50, 52, 54, thereby providing a means to assess or analyze the individual performance or effectiveness of the tool.

It should also be appreciated that, as opposed to including a single first soil roughness sensor 104A and a single second soil roughness sensor 104B, an array of first and second soil roughness sensors 104A, 104B may be provided on the work vehicle 10 and/or the implement 12. For instance, as shown in FIG. 3, an array of first soil roughness sensors 104A may be provided at or adjacent to the forward end 74 of the implement 12 to allow surface roughness data to be captured for the portions 106 of the field passing between the work vehicle 10 and the implement 12 at various different locations along the width of the implement 12. Similarly, as shown in FIG. 3, an array of second soil roughness sensors 104B may be provided at or adjacent to the aft end 76 of the implement 12 to allow surface roughness data to be captured for the portions 108 of the field passing behind the implement 12 at various different locations along the width of the implement 12.

Additionally, it should be appreciated that, although the embodiments shown in FIGS. 1-3 illustrate two or more soil roughness sensors 104A, 104B installed on the work vehicle 10 and/or the implement 12, a single roughness sensor may be installed relative to the work vehicle 10 and/or the implement 12 to allow surface roughness data for the field to be captured. For instance, in one embodiment, it may be desirable to only have a single soil roughness sensor that captures surface roughness data either before or after the ground-engaging operation is performed. Alternatively, a single roughness sensor may be used to capture soil roughness data both before and after the ground-engaging operation is performed. For instance, by making a second pass across the same portion of the field or by mounting the surface roughness sensor along the side of the work vehicle 10 or the implement 12, before and after surface roughness data for same section of the field may be captured using a single surface roughness sensor.

Figure 4:
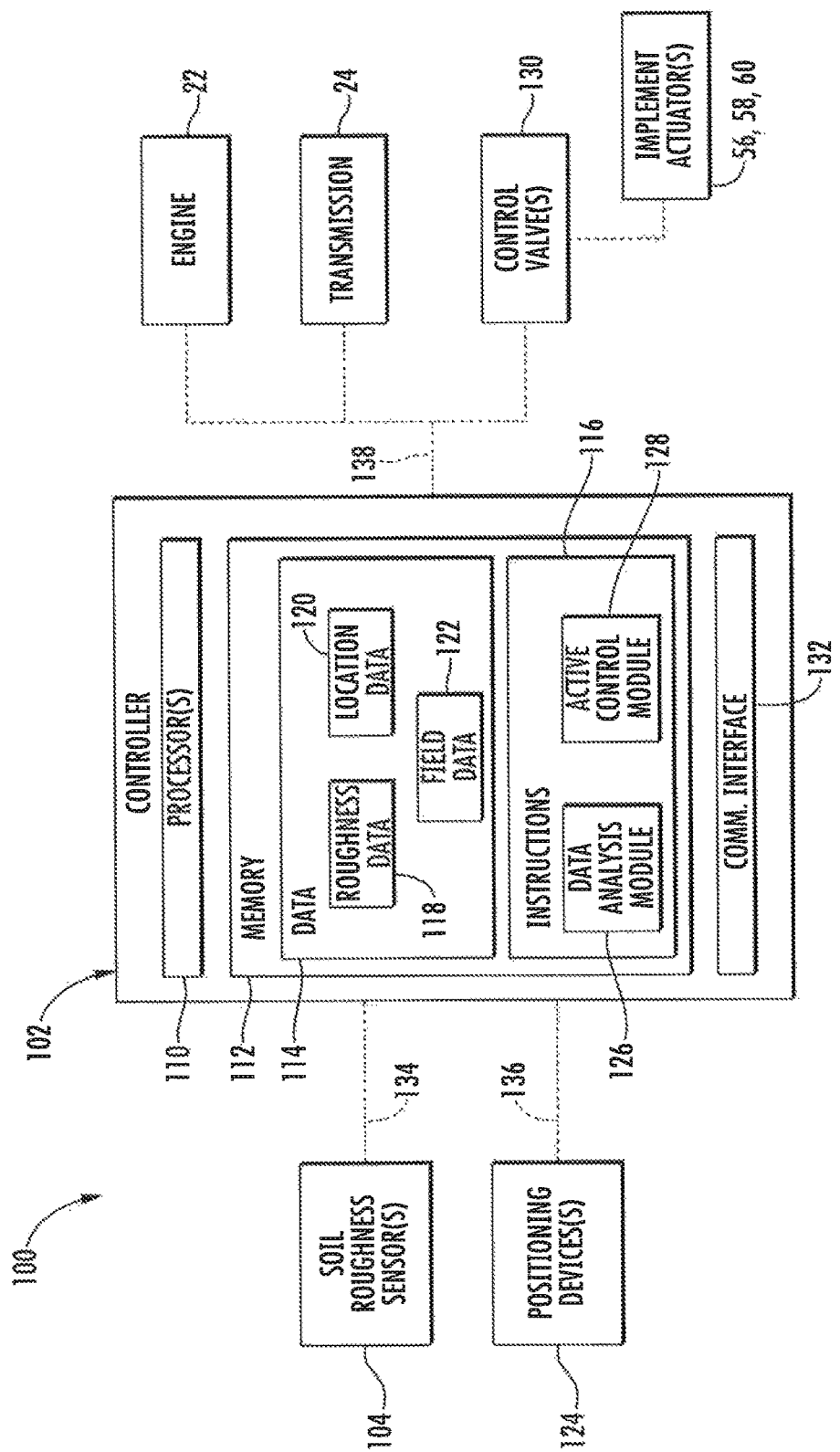
FIG. 4 illustrates a schematic view of one embodiment of a system for automatically monitoring the soil surface roughness of a field during the performance a ground-engaging operation in accordance with aspects of the present subject matter.

Referring now to FIG. 4, a schematic view of one embodiment of a system 100 for automatically monitoring the soil surface roughness as a ground-engaging operation is being performed within a field is illustrated in accordance with aspects of the present subject matter. In general, the system 100 will be described herein with reference to the work vehicle 10 and the implement 12 described above with reference to FIGS. 1-3. However, it should be appreciated that the disclosed system 100 may generally be utilized with work vehicles having any suitable vehicle configuration and/or implements having any suitable implement configuration.

In several embodiments, the system 100 may include a controller 102 and various other components configured to be communicatively coupled to and/or controlled by the controller 102, such as one or more soil roughness sensors 104 and/or various components of the work vehicle 10 and/or the implement 12. As will be described in greater detail below, the controller 102 may be configured to receive data from the soil roughness sensor(s) 104 that is associated with the surface roughness of the soil within sections of the field being passed by the work vehicle 10 and the implement 12 as a ground-engaging operation is being performed. Based on an analysis of the data received from the sensor(s) 104, the controller 102 may be configured to estimate the surface roughness of the soil across the various sections of the field for which surface roughness data was captured. As indicated above, in one embodiment, surface roughness data may be captured by the sensor(s) 104 for the same section of the field both before and after the ground-engaging operation has been performed. In such an embodiment, the controller 102 may be configured to analyze the pre-operation and post-operation data to determine a surface roughness differential for the analyzed section of the field. Moreover, based on the analysis of the surface roughness data, the controller 102 may also be configured to adjust the operation of the work vehicle 10 and/or the implement 12, as necessary, to ensure that the soil surface roughness, in general, and/or the surface roughness differential is maintained at a given target value and/or within a given target range.

In general, the controller 102 may correspond to any suitable processor-based device(s), such as a computing device or any combination of computing devices. Thus, as shown in FIG. 4, the controller 102 may generally include one or more processor(s) 110 and associated memory devices 112 configured to perform a variety of computer-implemented functions (e.g., performing the methods, steps, algorithms, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 112 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 112 may generally be configured to store information accessible to the processor(s) 110, including data 114 that can be retrieved, manipulated, created and/or stored by the processor(s) 110 and instructions 116 that can be executed by the processor(s) 110.

In several embodiments, the data 114 may be stored in one or more databases. For example, the memory 112 may include a roughness database 118 for storing surface roughness data received from the soil roughness sensor(s) 104. For example, the soil roughness sensor(s) 104 may be configured to continuously or periodically capture surface roughness data of adjacent portion(s) of the field as the ground-engaging operation is being performed via the implement 12. In such an embodiment, the surface roughness data transmitted to the controller 102 from the soil roughness sensor(s) 104 may be stored within the roughness database 118 for subsequent processing and/or analysis.

Moreover, in addition to the initial or raw sensor data received from the soil roughness sensor(s) 104, final or post-processing roughness data (as well as any intermediate roughness data created during data processing) may also be stored within the roughness database 118. For example, as will be described below, the controller 102 may be configured to analyze the data received from the soil roughness sensor(s) 104 using one or more data processing techniques or algorithms to determine surface roughness values for the analyzed portions of the field. In such an embodiment, the processed roughness data and/or the roughness-related data generated during implementation of the data processing techniques or algorithms may be stored within the database 118.

Additionally, in several embodiments, the memory 12 may also include a location database 120 storing location information about the work vehicle 10 and/or the implement 12. Specifically, as shown in FIG. 4, the controller 102 may be communicatively coupled to a positioning device(s) 124 installed on or within the work vehicle 10 and/or on or within the implement 12. For example, in one embodiment, the positioning device(s) 124 may be configured to determine the exact location of the work vehicle 10 and/or the implement 12 by using a satellite navigation position system (e.g. a GPS system, a Galileo positioning system, the Global Navigation satellite system (GLONASS), the BeiDou Satellite Navigation and Positioning system, and/or the like). In such an embodiment, the location determined by the positioning device(s) 124 may be transmitted to the controller 102 (e.g., in the form location coordinates) and subsequently stored within the location database 120 for subsequent processing and/or analysis. It should be appreciated that, in one embodiment, a first positioning device(s) 124 may be provided on and/or within the work vehicle 10 while a separate, second positioning device(s) 124 may be provided on and/or within the implement 12.

In several embodiments, the location data stored within the location database 120 may also be correlated to the surface roughness data stored within the roughness database 118. For instance, in one embodiment, the location coordinates derived from the positioning device(s) 124 and the surface roughness data captured by the sensor(s) 104 may both be time-stamped. In such an embodiment, the time-stamped data may allow each individual set of roughness data captured by the soil roughness sensor(s) 104 to be matched or correlated to a corresponding set of location coordinates received from the positioning device(s) 124, thereby allowing the precise location of the portion of the field associated with a given set of surface roughness data to be known (or at least capable of calculation) by the controller 102.

Additionally, as shown in FIG. 4, the memory 12 may include a field database 122 for storing information related to the field, such as field map data. In such an embodiment, by matching each set of surface roughness data captured by the soil roughness sensor(s) 104 to a corresponding set of location coordinates, the controller 102 may be configured to generate or update a corresponding field map associated with the field, which may then be stored within the field database 122 for subsequent processing and/or analysis. For example, in instances in which the controller 102 already includes a field map stored within the field database 122 that includes location coordinates associated with various points across the field, the surface roughness data captured by the soil roughness sensor(s) 104 (e.g., the point cloud) may be mapped or otherwise correlated to the corresponding locations within the field map. Alternatively, based on the location data and the associated sensor data, the controller 102 may be configured to generate a field map that includes the geo-located surface roughness data associated therewith.

Referring still to FIG. 4, in several embodiments, the instructions 116 stored within the memory 112 of the controller 102 may be executed by the processor(s) 110 to implement a data analysis module 126. In general, the data analysis module 126 may be configured to analyze the initial or raw sensor data captured by the soil roughness sensor(s) 104 to allow the controller 102 to estimate the surface roughness of one or more sections of the field. For instance, the data analysis module 126 may be configured to execute one or more suitable data processing techniques or algorithms that allows the controller 102 to accurately and efficiently analyze the sensor data, such as by applying corrections or adjustments to the data based on the sensor type, sensor resolution, and/or other parameters associated with the soil roughness sensor(s) 104, by filtering the data to remove outliers, by implementing sub-routines or intermediate calculations required to estimate the surface roughness of the soil, and/or by performing any other desired data processing-related techniques or algorithms.

Figure 5:
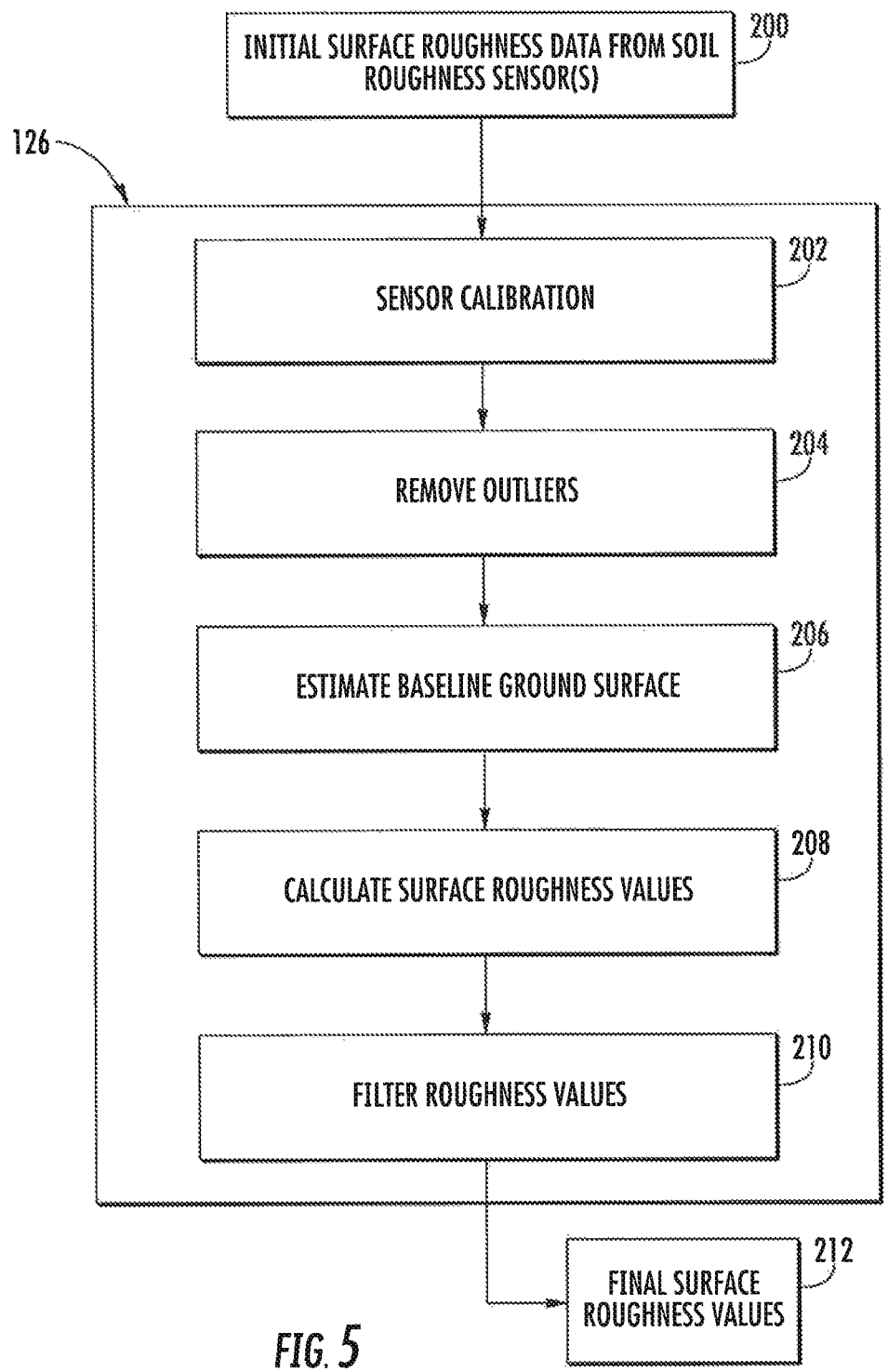
FIG. 5 illustrates one embodiment of a flow diagram showing various data processing steps that may be performed when analyzing soil surface roughness data in accordance with aspects of the present subject matter.

For example, FIG. 5 illustrates a simplified flow diagram showing various data processing steps or elements that may be implemented by the controller 102 via the data analysis module 126 when analyzing the initial or raw surface roughness data received from the soil roughness sensor(s) 104. It should be appreciated that, although FIG. 5 shows various exemplary data processing steps that can be used to process the initial surface roughness data received from the sensor(s) 104 (e.g., at box 200) and subsequently output final or processed surface roughness values (e.g., at box 212), the data analysis module 126 need not be configured to perform all of the illustrated data processing steps. For instance, in one embodiment, the data analysis module 126 may only perform one of the data processing steps or only a subset of the data processing steps. Additionally, although FIG. 5 depicts data processing steps performed in a particular order for purposes of illustration and discussion, the data flow described herein is not limited to any particular order or arrangement. One skilled in the art, using the disclosure provided herein, will appreciate that various data processing steps disclosed herein can be omitted, rearranged, combined, and/or adapted in various ways without deviating from the scope of the present disclosure.

As shown in FIG. 5, upon receipt of the initial surface roughness data from the sensor(s) 104, the data analysis module 126 may, for example, be configured to apply a sensor calibration to the data (e.g., at box 202) to adjust or correct the data based on one or more parameters associated with the soil roughness sensor(s) 104. In general, the specific sensor calibration applied to the data may vary depending on numerous factors, including, but not limited to, the type of sensor(s) 104 being used, the location and/or orientation of the sensor(s) 104 relative to the soil surface, and/or any other suitable sensor-related variables. For example, when the soil roughness sensor(s) 104 corresponds to a LIDAR scanner(s), a sensor calibration may be needed to account for the specific range and/or intensity associated with the LIDAR scanner(s). Similarly, when the soil roughness sensor(s) 104 corresponds to a stereographic camera, a sensor calibration may be needed to account for distortions within the images.

Additionally, as shown in FIG. 5, the data analysis module 126 may also be configured to filter out or remove outliers from the data (e.g., at box 204). Data outliers may, for example, correspond to non-ground-related points captured by the sensor(s) 104, such as dust, unwanted stubble, and/or the like. In one embodiment, the data analysis module 126 may be configured to implement a machine learning classification algorithm to remove any outliers from the data, such as by implementing decision trees, support vector machines, clustering and/or the like. In this regard, the actual geometry of the surface roughness data, itself, may produce features that can be identified as outliers using any suitable data processing technique. It should be appreciated that similar to the sensor calibration, the specific algorithm or technique used to remove the outliers from the data may be dependent on the type of sensor(s) 104 being used. For instance, a LIDAR scanner may produce intensity or reflectivity measurements in connection with the point cloud that may need to be removed as outliers.

Moreover, as shown in FIG. 5, the data analysis module 126 may also be configured to estimate a baseline ground surface based on the surface roughness data (e.g., at box 206). The baseline ground surface may generally be configured to serve as the reference point for calculating or determining the surface roughness measurements or values for a given section of the field. In one embodiment, the baseline ground surface may correspond to a best-fit line defined for the surface roughness data collected by the soil roughness sensor(s) 104. For instance, a set of surface roughness data for a given section of the field may be analyzed to calculate a best-fit line relative to the data (e.g., using the least squares method). The calculated best-fit line may then be established as the baseline ground surface for the set of surface roughness data being analyzed.

It should be appreciated that, in one embodiment, the baseline ground surface may be determined based solely on the calibrated sensor data (less outliers). This may be true, for example, when the data from the soil roughness sensor(s) 104 contains little or no sensor noise. However, if significant sensor noise exists, it may be desirable to further process the data to account for any variations due to the sensor noise prior to estimating the baseline ground surface. For instance, a principal component analysis (e.g., to remove linear trends in the data), a Gaussian process regression analysis (e.g., to assist interpolating points), and/or any other suitable algorithm may be used to process sensor data containing a significant amount of sensor noise.

Referring still to FIG. 5, the data analysis module 126 may also be configured to estimate or calculate a surface roughness value(s) for the field based on the surface roughness data (e.g., at box 208). Specifically, in several embodiments, the surface roughness value(s) for a given set of surface roughness data may be calculated as a function of the estimated baseline ground surface for such data. For example, in one embodiment, the surface roughness value(s) for a given set of roughness data may correspond to the standard deviation of the vertical distances defined between the associated data points and the best-fit line defining the baseline ground surface. In such an embodiment, a low standard deviation relative to the baseline ground surface (e.g., the data points tend to be closer to the best-fit line) may indicate that the soil has a low surface roughness (i.e., is more planar or smooth). Similarly, a high standard deviation relative to the baseline ground surface (e.g., the data points tends to be more spread out relative to the best-fit line) may indicate that the soil has a high surface roughness (i.e., is less planar or smooth).

Additionally, as shown in FIG. 5, the data analysis module 126 may also be configured to filter the calculated surface roughness values (e.g., at box 210). Specifically, in several embodiments, the surface roughness values may be filtered in time-sequence using a low-pass filter to produce stable roughness values or measurements that are robust to occasional outliers. For example, in one embodiment, an autoregressive-moving-average (ARMA) model may be used to filter the calculated roughness values.

Referring back to FIG. 4, by processing the raw sensor data received from the soil roughness sensor(s) 104 (e.g., via the data processing steps described above with reference to FIG. 5), the data analysis module 126 may be configured to determine surface roughness values for each section of the field for which data was captured. In one embodiment, such roughness values may then be used by the controller 102 as an input for performing one or more control actions, such as by automatically controlling the operation of the work vehicle 10 and/or the implement 12 (e.g., as will be described below), by automatically transmitting a notification to the operator regarding the surface roughness of the soil being processed, and/or by using the surface roughness values to automatically generate or update a field map.

In addition, as indicated above, the surface roughness values may also be used to calculate a surface roughness differential that provides an indication of the current effectiveness of the implement 12 in adjusting the roughness of the soil. For instance, when surface roughness data is captured for the same section of the field both before and after the ground-engaging operation has been performed, the data analysis module 126 may be configured to analyze the pre-operation and post-operation data to determine both a pre-operation surface roughness value and a post-operation surface roughness value for the field. The pre-operation and post-operation surface roughness values may then be compared to calculate the surface roughness differential following the performance of the ground-engaging operation. In one embodiment, the surface roughness differential may be calculated or expressed as a differential percentage, such as by using the following equation (Equation 1):

$$\% \text{ Differential} = \left(\frac{SRV_0 - SRV_1}{SR_0}\right) * 100 \quad (1)$$

wherein, $SRV_0$ corresponds to the before or pre-operation surface roughness value(s) and $SRV_1$ corresponds to the after or post-operation surface roughness value(s).

As shown in FIG. 4, the instructions 116 stored within the memory 112 of the controller 102 may also be executed by the processor(s) 110 to implement an active control module 128. In general, the active control module 128 may be configured to adjust the operation of the work vehicle 10 and/or the implement 12 by controlling one or more components of the vehicle 10 and/or the implement 12. Specifically, in one embodiment, when the estimated surface roughness value for a given section of the field differs from a target roughness value or range set for the field, the active control module 128 may be configured to fine-tune the operation of the work vehicle 10 and/or implement 12 in a manner designed to adjust the resulting surface roughness. Similarly, in one embodiment, when the estimated surface roughness differential for a given section of the field differs from a target differential value or range set for the field, the active control module 128 may be configured to fine-tune the operation of the work vehicle 10 and/or tillage implement 12 in a manner designed to adjust the resulting surface roughness differential. For instance, when it is desired to have a surface roughness differential that corresponds to at least a 25% reduction in the surface roughness of the soil following the performance of the ground-engaging operation, the active control module 128 may be configured to adjust the operation of the work vehicle 10 and/or the implement 12 in a manner that increases the differential (i.e., a control action configured to increase the effectiveness of the implement 12 in reducing the surface roughness of the field) when the estimated surface roughness differential is determined to be less than the target percentage.

It should be appreciated that the controller 102 may be configured to implement various different control actions to adjust the operation of the work vehicle 10 and/or the implement 12 in a manner that increases or decreases the surface roughness of the field following the performance of the ground-engaging operation. In one embodiment, the controller 102 may be configured to increase or decrease the operational or ground speed of the implement 12 to affect an increase or decrease in the resulting surface roughness of the soil. For instance, as shown in FIG. 4, the controller 102 may be communicatively coupled to both the engine 22 and the transmission 24 of the work vehicle 10. In such an embodiment, the controller 102 may be configured to adjust the operation of the engine 22 and/or the transmission 24 in a manner that increases or decreases the ground speed of the work vehicle 10 and, thus, the ground speed of the implement 12, such as by transmitting suitable control signals for controlling an engine or speed governor (not shown) associated with the engine 22 and/or transmitting suitable control signals for controlling the engagement/disengagement of one or more clutches (not shown) provided in operative association with the transmission 24.

In addition to the adjusting the ground speed of the implement 12 (or as an alternative thereto), the controller 102 may also be configured to adjust a ground-engaging parameter associated with the ground-engaging tools of the implement 12. For instance, as shown in FIG. 4, the controller 102 may be communicatively coupled to one or more valves 130 configured to regulate the supply of fluid (e.g., hydraulic fluid or air) to one or more corresponding actuators 56, 58, 60 of the implement 12. In such an embodiment, by regulating the supply of fluid to the actuator(s) 56, 58, 60, the controller 104 may automatically adjust the penetration depth, the down force, and/or any other suitable ground-engaging parameter(s) associated with the ground-engaging tools of the implement 12.

Referring still to FIG. 4, the controller 102 may also include a communications interface 132 to provide a means for the controller 102 to communicate with any of the various other system components described herein. For instance, one or more communicative links or interfaces 134 (e.g., one or more data buses or CAN buses, including ISOBUS connections) may be provided between the communications interface 132 and the soil roughness sensor(s) 104 to allow surface roughness data transmitted from the sensor(s) 104 to be received by the controller 102. Similarly, one or more communicative links or interfaces 136 (e.g., one or more data buses or CAN buses, including ISOBUS connections) may be provided between the communications interface 132 and the positioning device(s) 124 to allow the location information generated by the positioning device(s) 124 to be received by the controller 102. Moreover, as shown in FIG. 4, one or more communicative links or interfaces 138 (e.g., one or more data buses or CAN buses, including ISOBUS connections) may be provided between the communications interface 132 and the engine 22, the transmission 24, the control valves 130, and/or the like to allow the controller 102 to control the operation of such system components.

Referring now to FIGS. 6 and 7, example data plots of surface roughness data for a given section of a field are shown that illustrate data indicative of both relatively rough soil (FIG. 6) and relatively smooth soil (FIG. 7). In FIGS. 6 and 7, the x-axis generally represents a horizontal direction across the field (e.g., a direction along a plane extending parallel to the soil surface assuming a perfectly smooth surface) and the y-axis generally represents a vertical direction extending perpendicular to the horizontal direction.

In each data plot shown in FIGS. 6 and 7, the surface roughness data has been pre-processed (e.g., by applying a suitable sensor calibration and removing outliers) and subsequently plotted for a section or strip of the field represented generally by a 2-D plane. As particularly shown in FIG. 6, a first set of roughness data has been plotted that provides an estimated first soil surface for the field (e.g., as indicated by solid line 300). In addition, a best-fit line has been fitted to the data to establish a baseline ground surface for the data (e.g., as indicated by dashed line 302). Similarly, as particularly shown in FIG. 7, a second set of roughness data has been plotted that provides an estimated second soil surface line (e.g., as indicated by solid line 304), with a best-fit line having been fitted to the data to establish a baseline ground surface for the data (e.g., as indicated by dashed line 306). Based on the baseline ground surface 302, 306 determined for each data set, a surface roughness value(s) for the field may be estimated by calculating the standard deviation of the heights or vertical distances 308, 310 defined between each data point along each soil surface line 300, 304 and the corresponding baseline ground surface 302, 306. As shown in FIG. 6, given the large variance in the plotted data relative to the baseline ground surface 302, it may be determined that the section of the field associated with the first set of data was relatively rough when the data was captured. Similarly, as shown in FIG. 7, given the significantly smaller variance in the plotted data relative to the baseline ground surface 306, it may be determined that the section of the field associated with the second set of data was relatively smooth when the data was captured.

It should be appreciated that, when the first and second data sets correspond to pre-operation and post-operation data, respectively, for the same section of the field (e.g., as determined by the location data associated with the roughness data), the roughness value(s) calculated for each set of data may be compared to determine the surface roughness differential resulting from the performance of the associated ground-engaging operation. Specifically, by comparing the pre-operation and post-operation roughness values, it may be determined that the implement 12 reduced the soil roughness within the field by a given percentage, thereby providing an indication of the effectiveness of the implement 12 and/or an indication of a roughness-related parameter of the soil (e.g., rock content and/or the soil texture). Depending on the target differential percentage(s) set for the field, the controller 102 may then adjust the aggressiveness of the current operating settings for the implement 12, as necessary, to ensure that the target is maintained or achieved. For instance, if the surface roughness differential is too low, the controller 102 may be configured to adjust the aggressiveness of the current operating settings of the implement 12 in a manner designed to increase the surface roughness differential (e.g., by adjusting the penetration depth and/or the down force for the ground-engaging tools of the implement 12). Similarly, if the surface roughness differential is too high, the controller 102 may be configured to adjust the aggressiveness of the current operating settings of the implement 12 in a manner designed to reduce the surface roughness differential.

Figure 8:
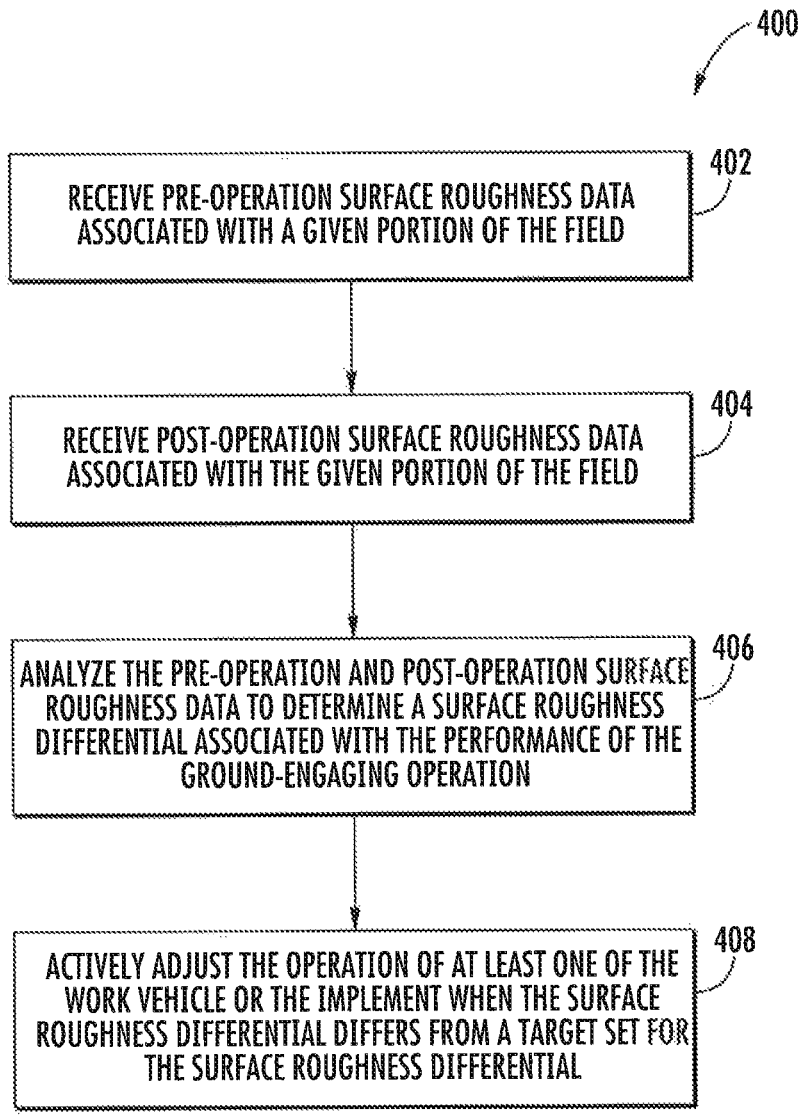
FIG. 8 illustrates a flow diagram of one embodiment of a method for automatically monitoring the soil surface roughness of a field during the performance a ground-engaging operation in accordance with aspects of the present subject matter.

Referring now to FIG. 8, a flow diagram of one embodiment of a method 400 for automatically monitoring the soil surface roughness as a ground-engaging operation is being performed within a field is illustrated in accordance with aspects of the present subject matter. In general, the method 400 will be described herein with reference to the work vehicle 10 and the implement 12 shown in FIGS. 1-3, as well as the various system components shown in FIG. 4. However, it should be appreciated that the disclosed method 400 may be implemented with work vehicles and/or implements having any other suitable configurations and/or within systems having any other suitable system configuration. In addition, although FIG. 8 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 8, at (402), the method 400 may include receiving pre-operation surface roughness data associated with a given portion of the field. For example, as indicated above, the controller 102 may be coupled to one or more non-contact soil roughness sensor 104 configured to capture surface roughness data of various portions of the field prior to the ground-engaging operation being performed on such portions of the field.

Additionally, at (404), the method 400 may include receiving post-operation surface roughness data associated with the given portion of the field. Specifically, in addition to capturing pre-operation surface roughness data of a given portion of the field, the soil roughness sensor(s) 104 may also be utilized to capture surface roughness data for the same portion of the field after the ground-engaging operation has been performed thereon. As indicated above, the pre-operation and post-operation surface roughness data may be matched or correlated to each other, for example, using the location data provided by the positioning device(s) 124.

Moreover, at (406), the method 400 may include analyzing the pre-operation and post-operation surface roughness data to determine a surface roughness differential associated with the performance of the ground-engaging operation. For example, as indicated above, the controller 102 may be configured to analyze the surface roughness data to allow pre-operation and post-operation surface roughness values to be calculated. Thereafter, the calculated surface roughness values may be used to determine the surface roughness differential resulting from the performance of the ground-engaging operation.

Further, at (408), the method 400 may include actively adjusting the operation of at least one of the work vehicle or the implement when the surface roughness differential differs from a target set for the surface roughness differential. Specifically, as indicated above, when the surface roughness differential differs from a target value set for such parameter (or falls outside a target range set for such parameter), the controller 102 may be configured to actively adjust the operation of the work vehicle 10 and/or the implement 12 in a manner that increases or decreases the surface roughness differential resulting from the ground-engaging operation. For instance, the controller 102 may be configured to adjust the ground speed at which the implement 12 is being towed and/or adjust one or more ground-engaging parameters associated with the implement 12.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for automatically monitoring soil surface roughness as a ground-engaging operation is being performed within a field using a work vehicle towing an implement, the method comprising:
   receiving, with one or more computing devices, pre-operation surface roughness data associated with a given portion of the field, the pre-operation surface roughness data corresponding to surface roughness data for the given portion of the field captured prior to the ground-engaging operation being performed thereon;
   receiving, with the one or more computing devices, post-operation surface roughness data associated with the given portion of the field, the post-operation surface roughness data corresponding to surface roughness data for the given portion of the field captured after the ground-engaging operation has been performed thereon;
   analyzing, with the one or more computing devices, the pre-operation and post-operation surface roughness data to determine a surface roughness differential associated with the performance of the ground-engaging operation; and
   actively adjusting, with the one or more computing devices, the operation of at least one of the work vehicle or the implement when the surface roughness differential differs from a target set for the surface roughness differential.

2. The method of claim 1, wherein the pre-operation surface roughness data and the post-operation surface roughness data is received by the one or more computing devices from at least one non-contact soil roughness sensor.

3. The method of claim 2, wherein the at least one non-contact soil roughness sensor comprises at least one of a LIDAR scanner, a stereographic camera, an ultrasound device or a radar device.

4. The method of claim 2, wherein receiving the pre-operation surface roughness data comprises receiving the pre-operation surface roughness data from a first non-contact soil roughness sensor provided in operative association with one of the work vehicle or the implement and wherein receiving the post-operation surface roughness data comprises receiving the post-operation surface roughness data from a second non-contact soil roughness sensor provided in operative association with the work vehicle or the implement.

5. The method of claim 4, wherein the first non-contact soil roughness sensor is installed on one of the work vehicle or the implement at a location forward of a ground-engaging tool of the implement and the second non-contact soil roughness sensor is installed on one of the work vehicle or the implement at a location aft of the ground-engaging tool.

6. The method of claim 1, further comprising:
   receiving location data associated with at least one of the pre-operation surface roughness data or the post-operation surface roughness data; and
   correlating the location data to the at least one of the pre-operation surface roughness data or the post-operation surface roughness data to generate or update a field map associated with the field.

7. The method of claim 1, wherein analyzing the pre-operation and post-operation surface roughness data comprises:
   analyzing the pre-operation surface roughness data to determine a pre-operation surface roughness value for the given portion of the field; and
   analyzing the post-operation surface roughness data to determine a post-operation surface roughness value for the given portion of the field;
   wherein the surface roughness differential is calculated based on the pre-operation and the post-operation surface roughness values.

8. The method of claim 7, further comprising:
   estimating a baseline ground surface as a function of at least one of the pre-operation surface roughness data or the post-operation surface roughness data; and
   determining at least one of the pre-operation surface roughness value or the post-operation surface roughness value as a function of the baseline ground surface.

9. The method of claim 8, wherein determining the at least one of the pre-operation surface roughness value or the post-operation surface roughness value as a function of the baseline ground surface comprises calculating the at least one of the pre-operation surface roughness value or the post-operation surface roughness value as a function of a standard deviation of vertical distances defined between the baseline ground surface and data points associated with the at least one of the pre-operation surface roughness data or the post-operation surface roughness data.

10. The method of claim 8, wherein the baseline ground surface corresponds to a best-fit line that is fitted to the at least one of the pre-operation surface roughness data or the post-operation surface roughness data.

11. The method of claim 1, further comprising analyzing at least one of the pre-operation surface roughness data or the post-operation surface roughness data to apply a sensor calibration or to remove data outliers.

12. A system for automatically monitoring soil surface roughness as a ground-engaging operation is being performed within a field using a work vehicle towing an implement, the system comprising:
   at least one non-contact soil roughness sensor configured to capture data associated with a soil roughness of the field as the ground-engaging operation is being performed;
   a controller commutatively coupled to the at least one non-contact soil roughness sensor, the controller including a processor and associated memory, the memory storing instructions that, when implemented by the processor, configure the controller to:
      receive, from the at least one non-contact soil roughness sensor, pre-operation surface roughness data associated with a given portion of the field, the pre-operation surface roughness data corresponding to surface roughness data for the given portion of the field capture prior to the ground-engaging operation being performed thereon;
      receive, from the at least one non-contact soil roughness sensor, post-operation surface roughness data associated with the given portion of the field, the post-operation surface roughness data corresponding to surface roughness data for the given portion of the field captured after the ground-engaging operation has been performed thereon;
      analyze the pre-operation and post-operation surface roughness data to determine a surface roughness differential associated with the performance of the ground-engaging operation; and
      actively adjust the operation of at least one of the work vehicle or the implement when the surface roughness differential differs from a target set for the surface roughness differential.

13. The system of claim 12, wherein the at least one non-contact soil roughness sensor comprises at least one of a LIDAR scanner, a stereographic camera, an ultrasound device or a radar device.

14. The system of claim 12, wherein the at least one non-contact soil roughness sensor comprises a first non-contact soil roughness sensor configured to capture the pre-operation surface roughness data and a second non-contact soil roughness sensor configured to capture the post-operation surface roughness data.

15. The system of claim 14, wherein the first non-contact soil roughness sensor is installed on one of the work vehicle or the implement at a location forward of a ground-engaging tool of the implement and the second non-contact soil roughness sensor is installed on one of the work vehicle or the implement at a location aft of the ground-engaging tool.

16. The system of claim 12, further comprising a positioning device communicatively coupled to the controller, the controller being configured to receive location data from the positioning device associated with at least one of the pre-operation surface roughness data or the post-operation surface roughness data and correlate the location data to the at least one of the pre-operation surface roughness data or the post-operation surface roughness data to generate or update a field map associated with the field.

17. The system of claim 12, wherein the controller is configured to analyze the pre-operation surface roughness data to determine a pre-operation surface roughness value for the given portion of the field and analyze the post-operation surface roughness data to determine a post-operation surface roughness value for the given portion of the field, the surface roughness differential being calculated based on the pre-operation and the post-operation surface roughness values.

18. The system of claim 17, wherein the controller is further configured to estimate a baseline ground surface as a function of at least one of the pre-operation surface roughness data or the post-operation surface roughness data and determine at least one of the pre-operation surface roughness value or the post-operation surface roughness value based on the baseline ground surface.

19. The system of claim 18, wherein the controller is configured to calculate the at least one of the pre-operation surface roughness value or the post-operation surface roughness value as a function of a standard deviation of vertical distances defined between the baseline ground surface and data points associated with the at least one of the pre-operation surface roughness data or the post-operation surface roughness data.

20. The system of claim 18, wherein the baseline ground surface corresponds to a best-fit line that is fitted to the at least one of the pre-operation surface roughness data or the post-operation surface roughness data.

* * * * *